Dec. 29, 1964     L. M. MILLER     3,162,981
METHOD AND MEANS FOR TRANSPLANTING
Filed July 14, 1961
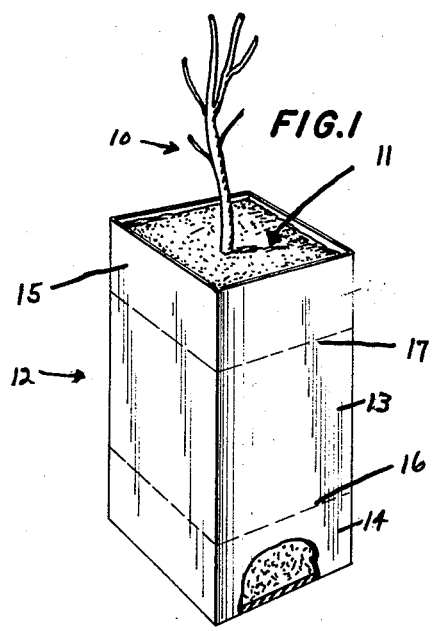
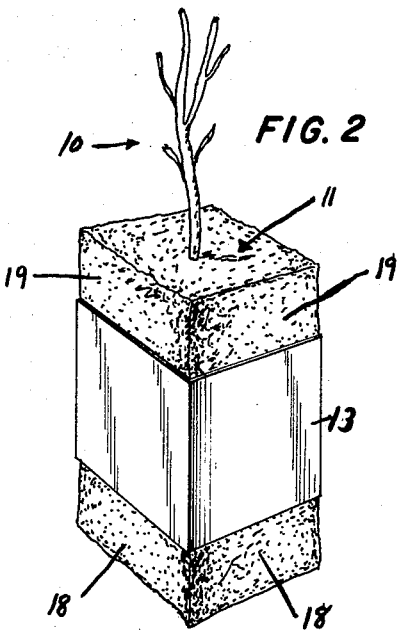
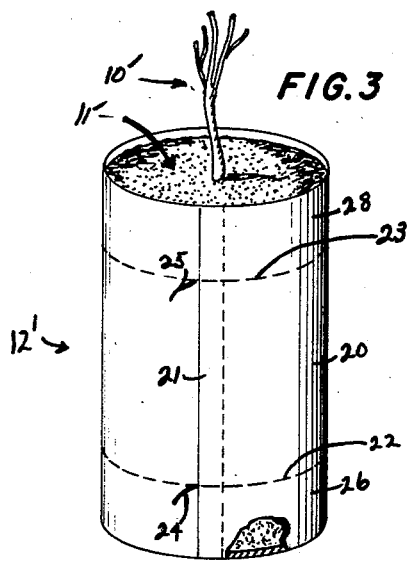
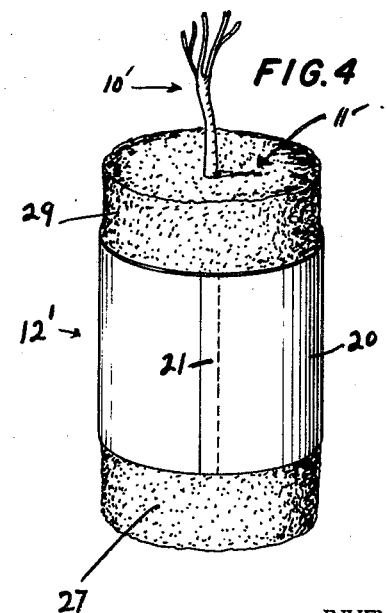
INVENTOR
LEON M. MILLER
BY *Fisher, Christen and Goodson*
ATTORNEYS

United States Patent Office 3,162,981
Patented Dec. 29, 1964

3,162,981
METHOD AND MEANS FOR TRANSPLANTING
Leon M. Miller, Rte. 5, Tyler, Tex.
Filed July 14, 1961, Ser. No. 124,120
2 Claims. (Cl. 47—58)

This invention relates to the horticultural arts, and more particularly to a method and means for transplanting living organisms from one environment to another.

One aspect of this invention relates to an improved container for transplanting plant life, which is capable of providing complete protection for the root structure and associated soil in which the roots have grown, and which is also capable of insuring a more rapid adaption of the plant life to the environment to which it is transplanted.

A feature of the invention is the provision of a container made of material which is substantially indestructible by normal handling during shipment and in the various stages of transplanting, and which is arranged in a manner such that a major portion of the material may be removed so that the plant life contained within may readily and quickly adapt itself to the conditions of the soil to which it is transplanted.

Another feature of the invention is the provision of a container for living plant life composed of material which is readily decomposed by natural forces in the soil, but which will completely protect the contained plant life during shipment and handling.

A still further feature of the invention is the provision of a packaged article of living plant life which is capable of withstanding all the normal hazards of shipment and handling, but which may be quickly and easily adapted for natural drainage and soil conditions of a new environment.

Other features and improvements will be apparent after reading the following description in connection with the drawings, in which:

FIG. 1 is a perspective view of one form of packaged living plant life as prepared for shipment in accordance with the present invention;

FIG. 2 is a perspective view of the article shown in FIG. 1 just prior to transplanting;

FIG. 3 is another form of prepackaged plant prepared for shipment, and;

FIG. 4 is a perspective view showing the article of FIG. 3 just prior to transplanting.

Referring now to the drawing in detail, the numeral 10 indicates generally a species of plant life, shrub, or the like, which has its roots (not shown) embedded in a mass of earth, indicated generally at 11, in which the plant has originally been grown. As shown in FIGS. 1 and 2, the mass of earth is generally rectangular in outline and has been removed from the surrounding soil in a substantially undisturbed condition. In order to ship the plant, a container, indicated generally at 12, is provided which completely surrounds the sides and bottom of the earth 11. In the examples shown, the interior dimensions of the container are substantially identical with those of the earth mass so as to closely confine the earth and prevent it from becoming detached from the root structure of the plant.

The container 12 is subdivided into two or more sections, the line of demarcation between adjacent sections being defined by one or more horizontal planes. Thus, it may comprise a central portion 13 and a bottom portion 14 which would include a bottom surface (not shown) to give support to the underside of the earth 11. The container may also include an upper portion 15.

This container may be fabricated from a variety of sheet materials. In a preferred form it may be formed in a conventional manner from cardboard which has the advantage of being substantially indestructible during the handling incidental to shipment of the plant, but which also will readily decompose in a short time when buried in the soil after transplanting.

In any event, suitable means should be provided to delineate the various component sections of the container. If the material chosen is cardboard, or the like, the means defining the component sections may comprise a series of spaced perforations or lines of weakening as indicated by numerals 16 and 17.

Whatever the materials used and the means employed to form the lines of weakening, or delination, 16 and 17, their purpose is to provide a container which will protect the mass of earth 11 over the entire exposed surface of its sides and bottom, but which may be readily separated to expose portions of the earth's surface when desired.

It will be obvious that once a plant has been removed from its native soil, it is highly desirable to keep the earth associated with its root structure intact in its entirety during subsequent handling and shipment and until it is re-planted in the soil at another location. What may not be so obvious is that when the plant has been re-planted, not only should adequate provision be made to permit drainage of water downwardly through the original earth associated with the root structure of the plant, but it is also essential that this original earth should quickly become intermingled with, or bonded to the surrounding soil at the new location.

This is true for two reasons; one reason is purely physical since the force of wind blowing against the portion of the plant exposed above the earth tends to pull it upwardly out of the earth in addition to bending it over. Since these bending and pulling forces are transmitted to the root structure of the plant, they can only be resisted by the soil located above the roots; therefore, it is essential that the small portion of soil 11, which has been transplanted with the plant, should quickly become physically interconnected or bonded with the new soil into which it is transplanted.

It is also true that the nutrient materials which feed the plant are usually not sufficient in the small portion of earth contained within the transplanting container to sustain the plant during normal growth. Normal soil conditions are such that an area of ground several times the area of the transplanted package is required to provide the necessary natural chemical materials for continued growth of the plant. These materials are more heavily deposited near the surface of the soil and therefore they can only be carried into the transplaned soil 11 from the sides thereof. It is not enough merely to expose the bottom of the transplanted soil to permit drainage since practically none of the chemicals in the adjacent soil will be carried upwardly toward the root structure of the plant.

For these reasons, one of the advantages of the present invention is that when the hole into which the plant is to be placed has been dug, the removal of the bottom portion 14 exposes a substantial area of the sidewall 18 of the transplanted earth. Even if the package were constructed so that only one or two of the sidewalls of the bottom section were removed, leaving the bottom wall under the earth intact, the advantage would still obtain that one or more of the sidewalls 18 of the earth would be exposed for rapid bonding with the adjacent earth, while at the same time, there would still be sufficient drainage through the exposed sidewall for any water which happened to fall above it.

The removal of the upper portion 15, prior to placing of the plant in its transplanted opening, further exposes a substantial area of the upper sidewall 19 of the transplanted earth.

The exposure of the upper sidewalls insures that rapid bonding of the transplanted earth 11 with that of the soil of its new surroundings will occur most rapidly where it will be most needed. This is true because the movement of the trunk or stem of the plant is greatest at the point where it enters the ground and it is therefore at this point rather than further down that the early stability of the soil is required. Moreover, in spite of the fact that a substantial amount of the sidewalls of the earth is exposed by the removal of the upper and bottom sections 14 and 15, the fact that the central portion 13 remains in place insures against disintegration even during last moments of handling prior to the final transplanting.

In the form of the invention shown in FIGS. 3 and 4, a plant, indicated generally by the numeral 10', has its roots (not shown) encased in a generally cylindrical mass of earth 11' in which it was originally grown prior to being removed for transplanting. In this instance, the earth may be enclosed in a container 12', which comprises a single sheet of heavy paper or cardboard 20 wrapped around it and secured along the longitudinal seam 21 by means of a suitable adhesive. As in the previous modification, the container will normally include a bottom (not shown) which is attached in a conventional manner to the lower end of the sheet 20. A pair of rip cords 22 and 23 are glued, or otherwise attached, to the inner surface of the sheet 20 and extend around the circumference of the container disposed in horizontal planes.

Each of the rip cords has one end, respectively indicated at 24 and 25, exposed outwardly of the container. Thus, when the end 24 is pulled, the rip cord 22 will sever the bottom portion 26 of the container from the sheet 20, after which, it can be removed to expose the bottom and sidewall 27 of the original mass of earth. Likewise, by grasping the end 25 of the rip cord 23, the upper portion 28 may be separated from the sheet 20 and removed to expose the upper sidewall 29 of the transplanted earth. Finally, as in the previous instance, the central section of the sheet 20 remains in place to give a certain amount of support to the earth mass during the handling incidental to placing the plant in the prepared opening to which it is transplanted.

In preparing the plant for shipping, it is desirable to remove a mass of earth surrounding the root structure which can be described as generally "tubular," although in the first modification, this "tube" is rectangular in horizontal cross-section. By removing a tubular portion of earth which conforms to the horizontal cross-section of the container, it may readily be deposited in the container so as to be closely confined and supported therein during shipment. This tubular form also ensures that the exposed sidewall structure will rapidly become intermingled and bonded to the adjacent soil into which it is transplanted.

While the use of materials such as heavy paper, or cardboard, for the portion of the container that is buried in the soil when the transplanting takes place, will ensure that this portion of the container will rapidly be decomposed by the action of water and chemicals in the soil so as not to interfere with the normal growth of the roots, it should be understood that rapidly decomposable materials need not necessarily be employed.

The fact that a major portion (approximately one-half) of the sidewall of the tubular earth mass is exposed when transplanting takes place means that, in the event the central portion of the container is fabricated of sheet metal or plastic, there is still room for the roots to grow outwardly below, or above, the central portion of the container prior to its eventual destruction.

Having disclosed a method and means for accomplishing the purposes of this invention, it will be apparent that modifications and improvements may be made by one skilled in the art which would come within the scope of the appended claims.

I claim:

1. Method of transplanting living plants comprising the steps of forming a generally tubular earth mass of the soil associated with the root structure of the plant, closely enclosing substantially the entire mass of earth with substantially impervious sheet wrapping material for shipment, removing a portion of said wrapping material prior to transplanting to expose a substantial portion of the side wall of the earth mass, and retaining a portion of the wrapping material in place to encircle a medial portion of the tubular earth mass for partial support.

2. Method of transplanting living plants comprising the steps of forming a tubular earth mass of the soil associated with the root structure of the plant, closely enclosing the entire side structure and bottom of the earth mass with substantially impervious sheet wrapping material for shipment, removing a portion of said wrapping material prior to transplanting sufficient to expose a substantial area of the side and bottom structure of the earth mass, and retaining a sufficient amount of the wrapping material in place to encircle a medial area of the tubular earth mass for partial support.

References Cited in the file of this patent

UNITED STATES PATENTS

| | | |
|---|---|---|
| 117,378 | Brook | July 25, 1871 |
| 498,608 | Aylworth | May 30, 1893 |
| 1,200,396 | Southard | Oct. 3, 1916 |
| 1,775,838 | Wedge | Sept. 16, 1930 |
| 1,993,620 | Otwell | Mar. 5, 1935 |
| 2,079,116 | Gardner | May 4, 1937 |
| 2,083,571 | Levandowsky | June 15, 1937 |